US008421363B2

(12) United States Patent
Li

(10) Patent No.: US 8,421,363 B2
(45) Date of Patent: Apr. 16, 2013

(54) LOW IGNITION VOLTAGE INSTANT START FOR HOT RE-STRIKE OF HIGH INTENSITY DISCHARGE LAMP

(76) Inventor: Jianwu Li, Solon, OH (US)

( * ) Notice: Subject to any disclaimer, the term of this patent is extended or adjusted under 35 U.S.C. 154(b) by 600 days.

(21) Appl. No.: 12/166,532

(22) Filed: Jul. 2, 2008

(65) Prior Publication Data

US 2010/0001656 A1 Jan. 7, 2010

(51) Int. Cl.
*H05B 37/02* (2006.01)

(52) U.S. Cl.
USPC .......... 315/209 CD; 315/209 SC; 315/209 M

(58) Field of Classification Search ............. 315/209 M, 315/239, 241 R, 242, 243, 276, 279, 282, 315/283, 209 CD, 209 SC; 323/901
See application file for complete search history.

(56) References Cited

U.S. PATENT DOCUMENTS

| | | | | |
|---|---|---|---|---|
| 3,732,460 | A * | 5/1973 | Wattenbach | 315/123 |
| 4,323,824 | A * | 4/1982 | Roche et al. | 315/289 |
| 4,668,204 | A | 5/1987 | English et al. | |
| 4,680,509 | A * | 7/1987 | Fallier et al. | 315/290 |
| 4,724,362 | A * | 2/1988 | Lester | 315/289 |
| 4,795,945 | A * | 1/1989 | Mayer | 315/276 |
| 4,910,432 | A * | 3/1990 | Brown et al. | 313/620 |
| 5,298,837 | A | 3/1994 | Diestl | |
| 5,394,062 | A | 2/1995 | Minarczyk et al. | |
| 5,444,334 | A * | 8/1995 | Speaker et al. | 315/209 CD |
| 5,449,980 | A * | 9/1995 | Kiefer et al. | 315/240 |
| 5,512,801 | A | 4/1996 | Nissen | |
| 5,594,308 | A | 1/1997 | Nuckolls et al. | |
| 5,595,438 | A | 1/1997 | Burd | |
| 5,914,571 | A | 6/1999 | Beasley | |
| 5,986,413 | A * | 11/1999 | Zijlman | 315/291 |
| 6,072,286 | A | 6/2000 | Sears | |
| 6,091,208 | A | 7/2000 | Flory, IV | |
| 6,111,359 | A | 8/2000 | Work et al. | |
| 6,323,604 | B1 * | 11/2001 | Boenigk et al. | 315/290 |
| 7,339,330 | B2 * | 3/2008 | Brates et al. | 315/289 |
| 2002/0101164 | A1 | 8/2002 | Yan | |
| 2002/0171527 | A1 | 11/2002 | Minami et al. | |
| 2003/0225588 | A1 | 12/2003 | Myron et al. | |
| 2004/0219839 | A1 | 11/2004 | Faust et al. | |

FOREIGN PATENT DOCUMENTS

| | | |
|---|---|---|
| EP | 1 206 169 A2 | 5/2002 |
| GB | 2 203 302 A | 10/1988 |
| WO | WO 2006/079937 A1 | 8/2006 |

OTHER PUBLICATIONS

PCT/US2009/044443 International Search Report, mailed Aug. 10, 2009.

* cited by examiner

*Primary Examiner* — Thuy Vinh Tran
(74) *Attorney, Agent, or Firm* — Fay Sharpe LLP

(57) ABSTRACT

A lamp assembly includes a housing that selectively receives a removable, plug-in high intensity discharge (HID) lamp. A transformer and electrical circuit are received in the housing for providing an instant start, hot re-strike ignition of the lamp at less than 25 kilovolts. A circuit for an instant start, hot re-strike of an HID lamp supplies an ignition voltage to the HID lamp that includes pulses having an amplitude of less than 25 kilovolts and a frequency ranging from approximately 20 hertz to approximately 500 hertz. Preferably, the frequency is greater than 100 hertz, more preferably the frequency is approximately 150 hertz. The amplitude of pulses are preferably less than approximately 15 kilovolts, and more preferably approximately 8-10 kilovolts. The pulse width is approximately 200 nanoseconds and the peaks of the pulses are periodic with a period of approximately 2 milliseconds.

20 Claims, 7 Drawing Sheets

LOW IGNITION VOLTAGE INSTANT START FOR HOT RE-STRIKE OF HIGH INTENSITY DISCHARGE LAMP

BACKGROUND OF THE DISCLOSURE

This application is related to commonly-owned, co-pending application entitled: IGNITER INTEGRATED LAMP SOCKET FOR HOT RE-STRIKE OF HIGH INTENSITY DISCHARGE LAMP [Ser. No. 12/166,548], filed simultaneously herewith.

This disclosure relates to discharge lamps, and more particularly to high intensity discharge (HID) lamps such as ceramic metal halide (CMH) lamps where an instant start, hot re-strike of the lamp is desired. It finds particular application in HID lamps that are replaceable relative to the socket assembly, although it will be appreciated that selected aspects may find application in related uses.

In an instant start, hot re-strike application, ignition voltage is typically on the order of tens of thousands of volts (e.g., 25-30 kilovolts). This high voltage necessitates the use of high voltage cable from the igniter to the lamp socket and consequently better electrical insulation. This, in turn, adds cost to the assembly. In addition, a high voltage cable radiates electromagnetic interference (EMI) by acting as an antenna during lamp ignition. This may serve to render hot re-strike impractical in EMI sensitive applications such as health care.

It is known in other fields, such as in the automotive discharge headlamp environment, to integrate an igniter, lamp socket, and lamp into a single unit. In those applications, if the lamp requires replacement, the entire lamp, igniter, and lamp socket are disposed of and are subsequently replaced since the individual components are an integrated assembly. However, in non-automotive applications, this is not economically feasible since the useful life of the rest of the components is not limited to the life of the HID lamp, and the additional cost to replace the entire assembly is deemed unnecessary. Thus a need exists for hot re-strike applications of HID lamps in non-automotive applications such as commercial lighting, display lighting, office, stores, museums, stage lighting, television and film studios, etc.

After being turned off, a standard HID lamp usually requires a cooling time varying from 5 minutes up to 15 minutes for the lamp to be turned on again. This cooling time is required because the pressure inside the HID lamp's arc tube could be tens of atmosphere when the lamp is hot. In other words, a typical or regular ignition voltage of less than 5 kilovolts which can start a cold lamp does not provide a strong enough electric field to reignite across a high pressure plasmic gap between spaced electrodes when the HID lamp is hot. In order to achieve a HID instant start re-strike of a hot lamp (i.e., a hot re-strike), the assembly requires a much higher ignition voltage. A greater than 25 kilovolt of ignition pulse was typically used in an automotive discharge headlamp, and greater than 30 kilovolts of ignition pulse was used in other hot re-strike HID lamps for specialty applications.

This high ignition voltage causes a lot of issues and extra costs. For example, the high ignition voltage causes an electrode tip to sputter which shortens the effective life of the electrode and eventually will cause lamp failure. The high ignition voltage also deposits electrode material on the wall of the arc, blocks the light from the light emitting plasma, and degrades lamp performance. Moreover, the insulation must be necessarily increased to prevent undesired arcing in a high ignition, instant start HID system. The increased insulation complicates lamp design and results in increased costs. The high ignition voltage also presents severe EMI interference issues so that the system designers must take extra precautions to shield an ignition pulse, particularly in certain industries where EMI cannot be tolerated. Further, the ignition voltage generator costs more in order to generate the higher ignition voltage.

Consequently, traditional approaches result in a much more expensive solution to achieve instant start. The dielectric breakdown voltage for air is approximately 3 kilovolts per millimeter. With an ignition voltage greater than 20 kilovolt level, a breakdown air gap increases from less than 2 millimeters for a standard HID lamp to greater than 7 millimeters for instant start lighting systems. As apparent, this results in significant costs to the instant start system in order to modify standard design by providing insulation for the higher ignition voltage, providing a high voltage rated lamp base and lamp holder, and also use of a high voltage cable required to transfer the ignition pulse. Thus, hot re-strike ignition pulses on the order of 25 kilovolts cause much more severe EMI interference and require extra effort to shield the system. A need exists for an improved solution for hot re-strike application of an HID lamp that is replaceable, and an assembly that is reliable, repeatable, and has reduced costs.

SUMMARY OF THE DISCLOSURE

A lamp assembly includes a high intensity discharge (HID) lamp, a transformer and electrical circuit for providing an instant start, hot re-strike ignition of the lamp at less than 25 kilovolts.

A circuit for an instant start of an HID lamp includes means for supplying an ignition voltage to the HID lamp that includes means for providing breakdown voltage pulses having an amplitude of less than 25 kilovolts and a frequency ranging from approximately 20 hertz to approximately 500 hertz. Preferably, the frequency is greater than 100 hertz, more preferably the frequency is approximately 150 hertz.

The amplitude of the providing means is preferably less than approximately 15 kilovolts, and more preferably approximately 8-10 kilovolts. The pulse width of the providing means is approximately 200 nanoseconds and the peaks of the pulses are periodic with a period of approximately 2 milliseconds.

A primary benefit of the present disclosure is the reduced costs associated with an instant start, hot re-strike HID lamp assembly.

A primary benefit is the ability to significantly reduce the breakdown voltage required for an instant start, hot re-strike of an HID lamp.

Still another benefit is the reduced EMI and greater flexibility in the fixture design associated with the instant start, hot re-strike applications.

Still other benefits and advantages of this disclosure will become apparent upon reading and understanding the following detailed description of the preferred embodiments.

DETAILED DESCRIPTION OF THE PREFERRED EMBODIMENTS

Figure 1:
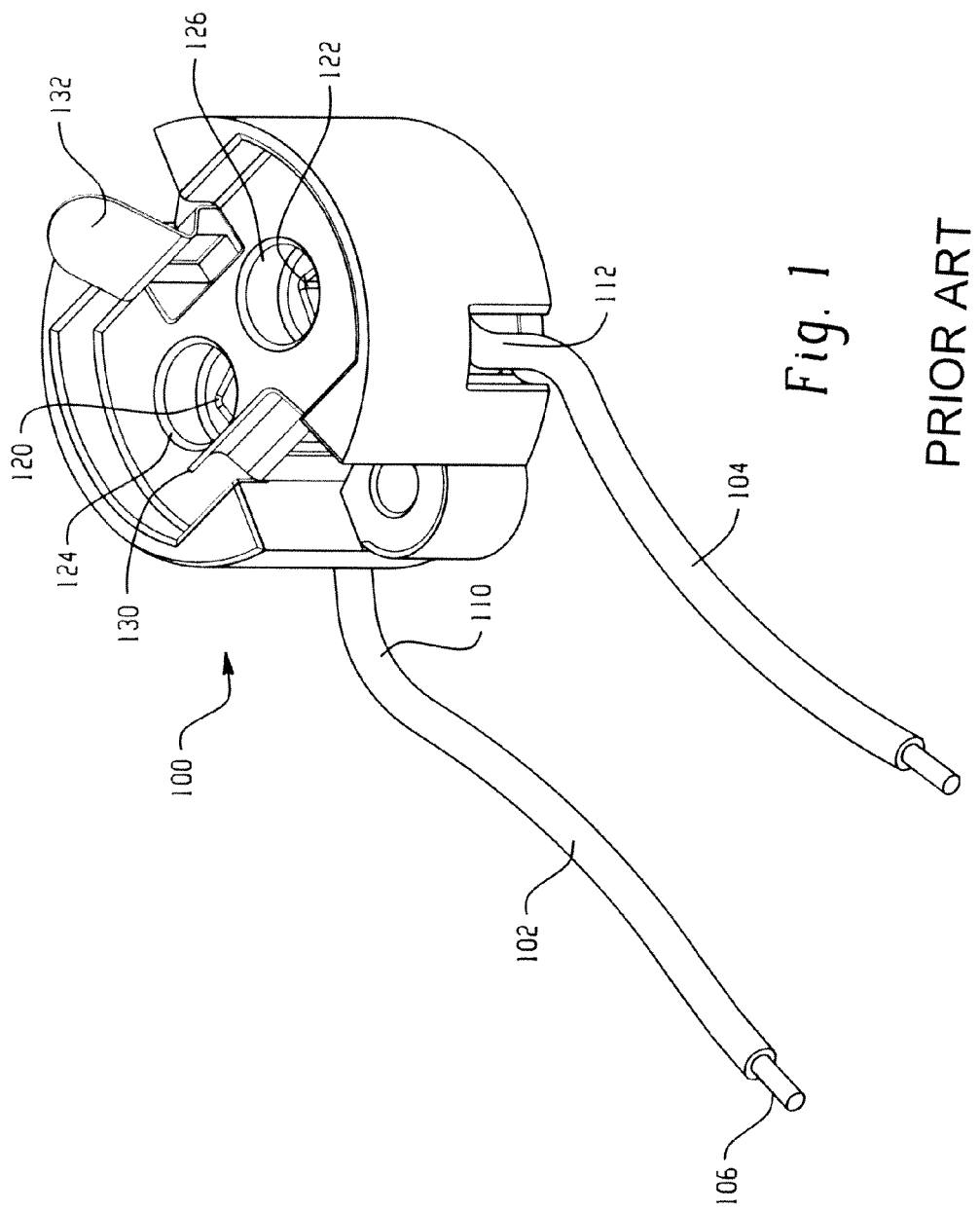
FIG. 1 is a perspective view of a lamp socket used in a conventional HID application.

FIG. 1 shows a conventional lamp socket housing or base 100 as is typically used with a high intensity discharge (HID) lamp (not shown) that is removably retained in the socket housing. More particularly, the socket housing includes first and second power cables 102, 104 that have respective first ends 106, 108 connected to an associated power source (not shown). Where the lamp assembly is intended for use in an instant start, hot re-strike application, the power cables 102, 104 are relatively heavy duty, high voltage cables that have substantial insulation to carry the voltage on the order of tens of thousands of volts and thereby provide a volt ignition pulse to the lamp received in the socket housing on the order of twenty five kilovolts (25 kV) to thirty kilovolts (30 kV). Thus, the power cables extend from the source that includes a ballast (not shown) and also includes a transformer that boosts the voltage from the level of hundreds of volts (less than 1200 volts) to 25 kV to 30 kV. Second ends 110, 112 of the power cables terminate within the socket housing and are electrically connected to electrical connectors 120, 122 received in corresponding recesses 124, 126, respectively. The recesses, and more particularly the connectors, are spaced apart a predetermined dimension such as a standardized 12 mm spacing that is predetermined in order to prevent breakdown across the air gap separating the connectors.

The socket housing further includes first and second spring clips 130, 132 that are generally disposed between the connectors and at right angles thereto to mechanically engage opposite sides of a base portion of the HID lamp. Again, and for subsequent purposes of comparison, the transformer and igniter assembly would be remotely located from the socket housing.

Figure 2:
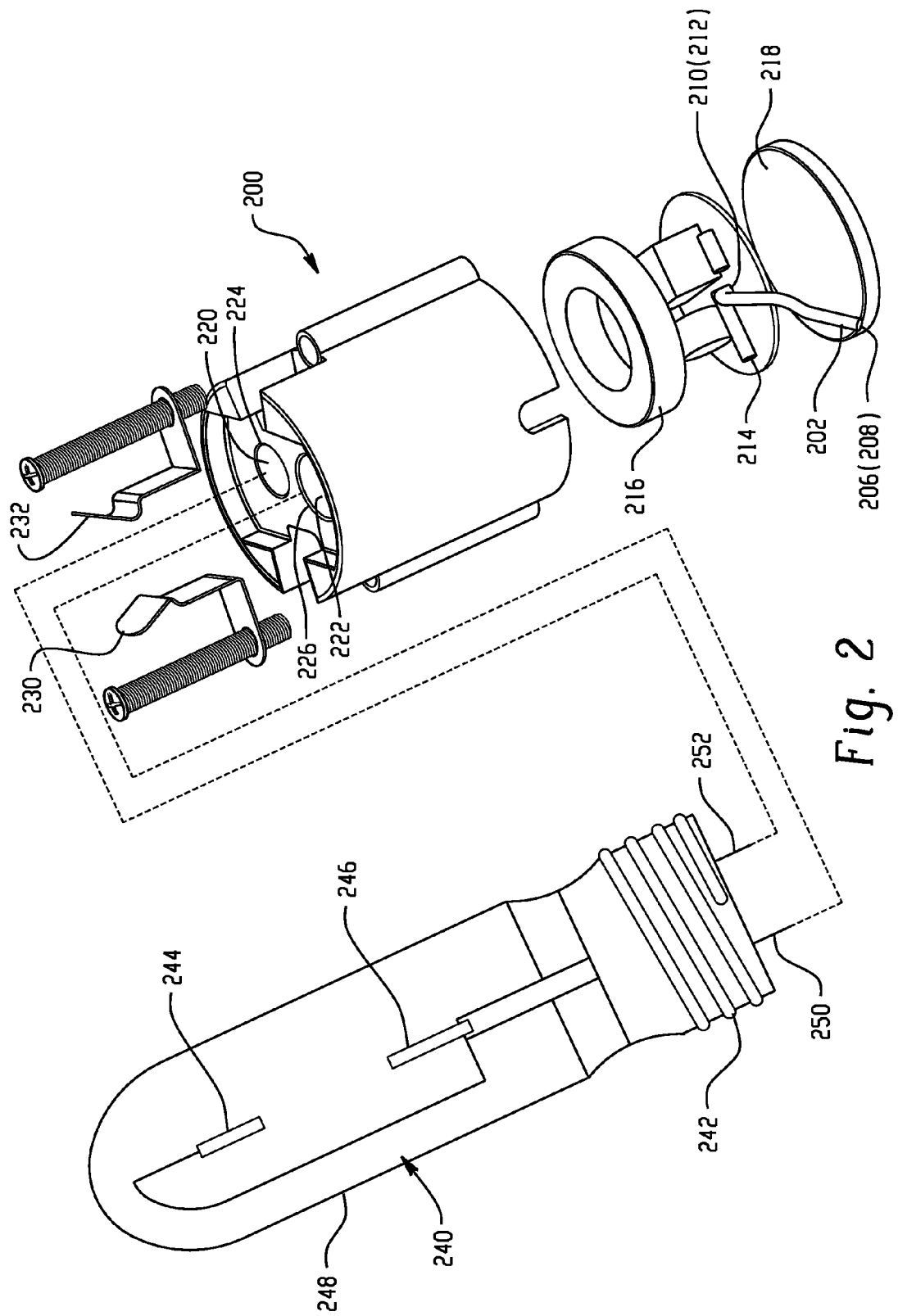
FIG. 2 is an exploded perspective view of a lamp assembly in a first preferred embodiment.
Figure 3:
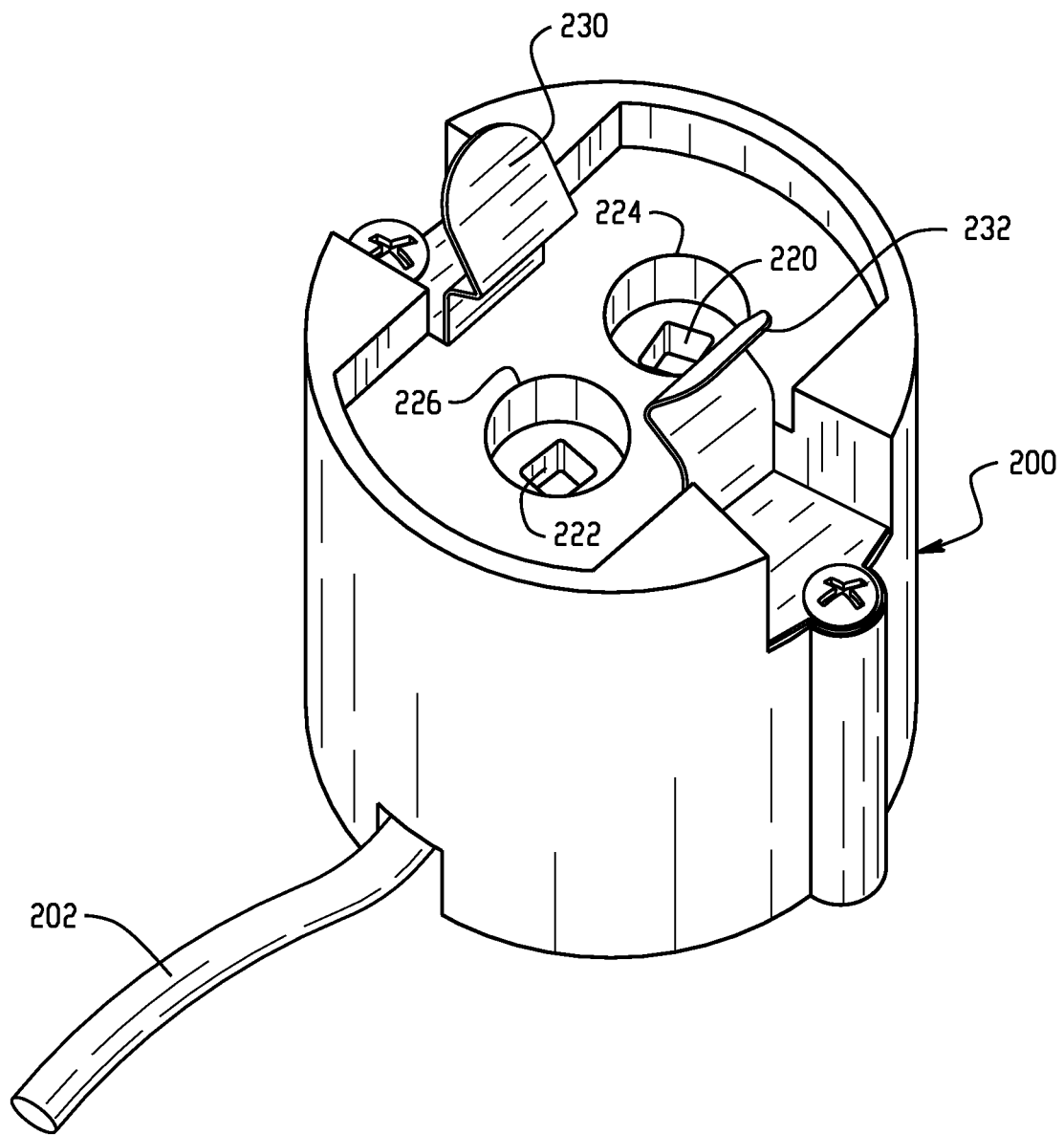
FIG. 3 is an enlarged perspective view of the socket housing assembly of FIG. 2.

FIGS. 2 and 3 illustrate a preferred embodiment of the present disclosure. Particularly, the lamp assembly includes a lamp socket housing 200 which is preferably a ceramic housing. Although only a single cable 202 is illustrated, it will be appreciated that the cable is a low voltage cable that receives first and second insulated wires, or alternatively a second power cable (not shown) but could be provided where each power cable receives a single wire. Again, first ends 206, 208 of the wires are adapted for electrical connection with an associated power source (not shown) while second ends 210, 212 connect to an operative electrical circuit or printed circuit board (PCB) 214. In addition, transformer 216 comprised of a metal wire wrapped around a core is also secured to the socket housing 200 to boost the voltage from an input voltage of less than 1200 volts to a desired instant start, hot re-strike ignition voltage less than 25,000 volts (25 kV), and more preferably between 8,000 and 10,000 volts (8-10 kV). The housing 200 includes an internal cavity dimensioned to receive the transformer and the printed circuit board. An end closure member 218 then closes off the end of the housing. Opposite connectors 220, 222 are received in associated recesses 224, 226. In addition, spring clips 230, 232 are secured to the housing and adapted to mechanically grip opposite surfaces of the HID lamp 240 and particularly base portion 242 of the lamp. The HID lamp includes first and second electrodes 244, 246 received in a sealed arc tube 248 and spaced apart at a predetermined dimension or arc discharge gap. The interior of the arc tube receives a gas fill so that in response to a sufficient voltage potential between the electrodes, the fill gas is broken down, establishes an arc, and the gas fill becomes a plasma that emits light at a predetermined spectrum. First and second outer leads 250, 252 extend from the envelope and are spaced apart the same dimension as the electrical connectors 220, 222 of the socket housing. In this way, the HID lamp 240 is removably secured to the socket housing where the outer leads 250, 252 are received in associated recesses 224, 226 to establish electrical connection with connectors 220, 222. In turn, the spring clips 230, 232 mechanically engage the base portion 242 of the lamp.

Because the transformer is located adjacent the electrical connectors 220, 222, only a very short distance of high voltage wire is required in this preferred arrangement. This limits the potential EMI impact of the assembly when compared to the prior arrangement of FIG. 1 where each of the cables 102, 104 is carrying high voltage. Further, the printed circuit board is received within the ceramic housing. This arrangement positions the ballast at a remote location where the elevated temperatures associated with operation of the lamp will not adversely impact the ballast operation. The igniter is incorporated into the lamp socket for instant start, hot re-strike application of a high intensity discharge lamp. For example, instant start, hot re-strike refers to a lamp that will start directly after being switched off for a period of time, and when switched back on, will start directly so that after one second, the lamp shall emit at least eighty percent (80%) of its rated luminous flux. The ballast supplies low voltage power in the range of hundreds of volts through low voltage cables 202 to the igniter disposed inside the lamp socket housing 200. The igniter includes a circuit or printed circuit board 214 in conjunction with the transformer 216 to boost the voltage from hundreds of volts to a voltage level as needed to achieve HID instant start. Again, as is known, an ignition pulse of 25 kilovolts to 30 kilovolts has been used in the past. As will be disclosed below, another embodiment allows a hot re-strike ignition breakdown voltage level less than 25 kv, preferably below 20 kv, and more particularly to a level of approximately 8-10 kilovolts. The integrated lamp socket eliminates the high voltage cable and essentially reduces the high voltage path to almost zero which, in turn, reduces the EMI. The ballast is located further away from the light source in the fixture design, and therefore the ballast's life and reliability is increased. The fixture design also has greater flexibility. Moreover, if the lamp needs to be replaced, it can be removed from the housing 200 without any extra replacement expense associated with the igniter, electrical circuitry, or housing.

Figure 4:
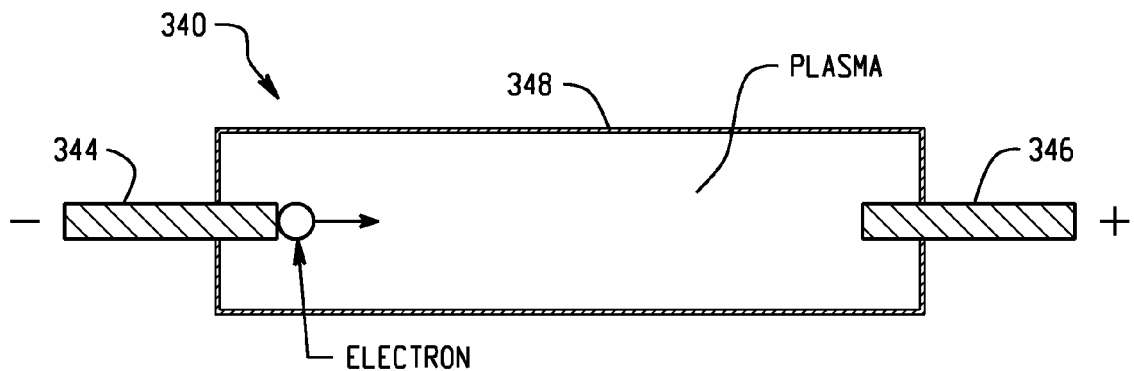
FIG. 4 is a schematic representation of prior art arc tube prior to the hot re-strike.
Figure 5:
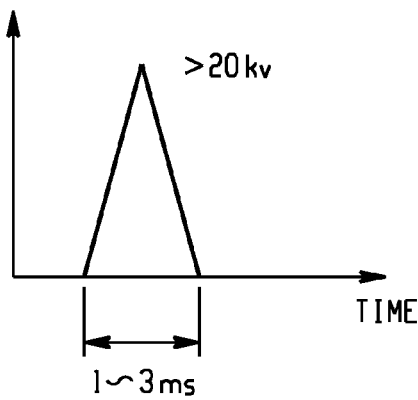
FIG. 5 is a graphical representation of a hot re-strike ignition pulse as used in prior art arrangements.
Figure 6:
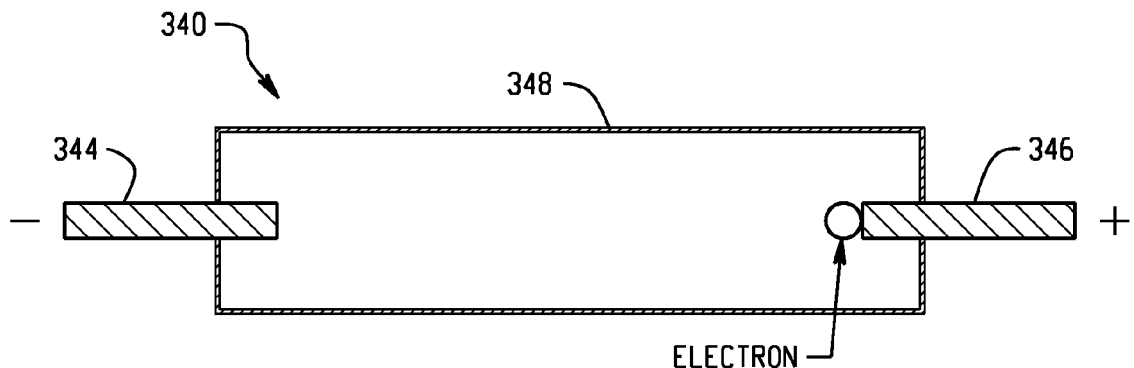
FIG. 6 is representation of the prior art arc tube after the ignition pulse.

FIGS. 4-6 exemplify the prior art ignition voltage for a hot re-strike application. As shown in FIG. 4, an HID lamp 340 includes first and second electrodes 344, 346 spaced apart by an arc gap within arc tube 348. In response to a breakdown voltage pulse, it is believed that electrons are moved from the negative electrode across the plasma within the arc tube 348 to the second or positive electrode 346. The hot re-strike pulse is shown or represented in FIG. 5 as a pulse on the order of greater than 20 kilovolts as applied for 1-3 milliseconds. This large breakdown voltage assures that electrons reach the second electrode for a hot re-strike.

Figure 7:
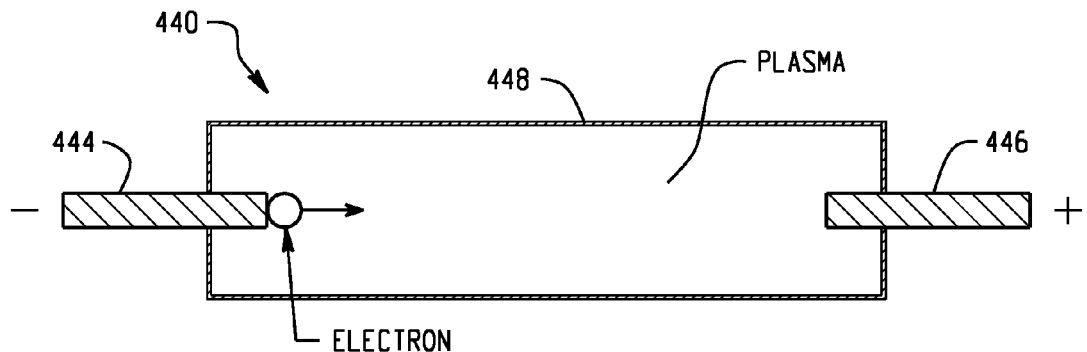
FIGS. 7-9 are views similar to FIGS. 4-6 showing the new ignition pulse arrangement for instant start, hot re-strike.
Figure 8:
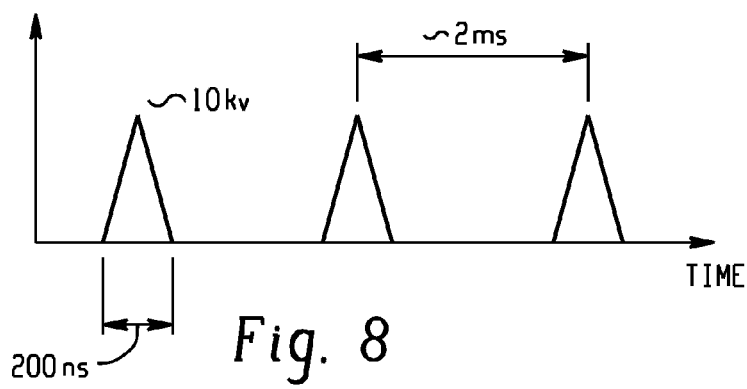
Figure 9:
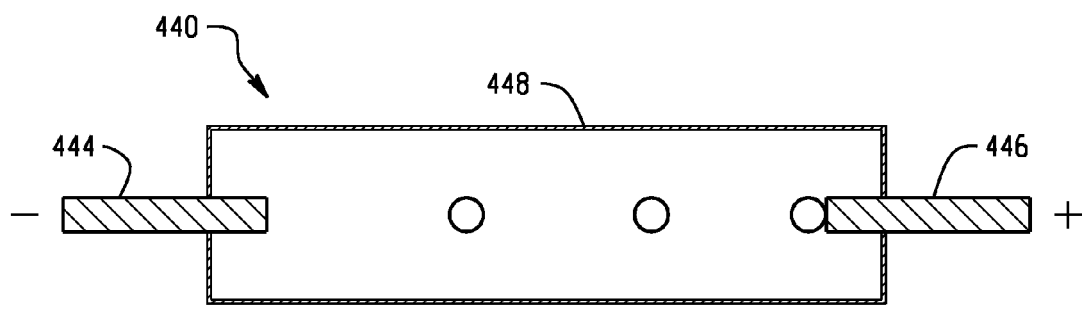

As similarly illustrated in FIGS. 7-9, the present disclosure provides an alternative solution to the elevated breakdown voltages required in the prior art. More specifically, HID lamp 440 includes first and second electrodes 444, 446 received in the arc tube 448. A series of ignition pulses at a high frequency are used because the filed varies between the electrodes. For example, FIG. 8 suggests that ignition pulses on the order of 10 kilovolts applied for 200 nanoseconds (shown as triangular shaped ignition pulses) may be spaced apart by 2 milliseconds to achieve an instant start, hot re-strike of the HID lamp. It is believed that the electrons may be urged by the individual pulses toward the positive electrode as represented in FIG. 9.

Figure 10:
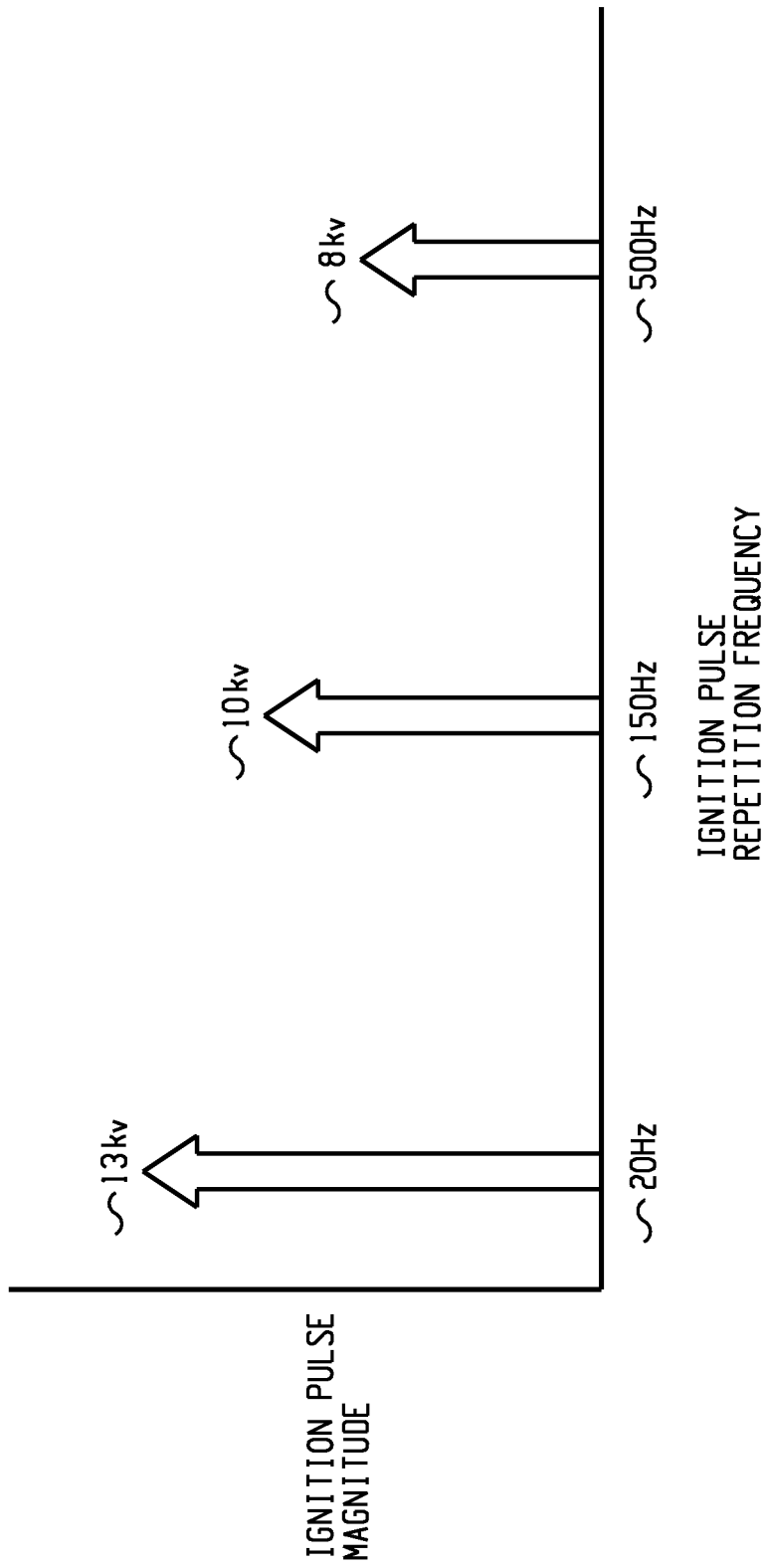
FIG. 10 is a schematic representation of improved reductions in the ignition pulse amplitude with representative pulse repetition frequencies.

Actual testing as represented in FIG. 10 indicates that an ignition pulse amplitude of approximately 13 kilovolts provided at a repeat frequency of 20 hertz was sufficient to provide an instant start hot re-strike. Likewise, 10 kilovolt pulses at a frequency of 150 hertz successfully re-started the lamp and even an 8 kilovolt series of pulses at a frequency of 500 hertz achieved instant start, hot re-strike. As will be appreciated by one skilled in the art, this is a significant reduction from the level of approximately 25 kilovolts required in the prior art. This results in a substantial savings with regard to prior instant start arrangements.

A standard HID lamp usually requires a cooling time and an ignition voltage between 25 kilovolts and 30 kilovolts, and results in extra costs since the high ignition voltage causes the electrode to sputter. Sputtering shortens the life of the electrode and causes lamp failure. Sputtering also deposits the electrode material onto the wall of the arc tube and thereby blocks the light from the plasma further degrading lamp performance. The high ignition voltage requires an associated increase in insulation to prevent arcing which further complicates lamp design and contributes to additional costs. The high ignition voltage also has more severe EMI interference and requires system design to take into consideration additional shielding against the ignition pulse.

The present disclosure on the other hand provides a solution that enables HID instant start with low ignition voltage, and reduces the issues and extra costs associated with the high ignition voltage of prior arrangements. The present disclosure makes the HID instant start system more affordable and able to be applied in more general applications such as office, warehouse, emergency lighting, etc. The present disclosure and associated method uses multiple ignition pulses of a relatively low amplitude to relay the electrons across the high pressure plasma gap between the electrodes to achieve instant start when the HID lamp is hot, e.g., a hot re-strike. It is believed that each ignition pulse forces the electrons to move only a fraction of the total plasma gap between the electrode tips. Before the electrons oscillate back to the original position at the first or negative electrode, the next ignition pulse is applied and moves the electrons another fraction of the arc gap. When the ignition pulse is repeated at a high frequency, it is believed that the electrons will move across the plasma gap from one electrode to another and result in a lower magnitude or amplitude of the ignition pulse to achieve its start. Although theoretically repeating the ignition pulse at as high a frequency as possible would be desirable, in practice the ignition pulse repetition frequency is limited by the hardware and other system considerations. Sufficient instant start, hot re-strike results were achieved with an ignition pulse repeated at a frequency of approximately 500 hertz and at an amplitude of less than 10 kilovolts. When the repetition frequency of the ignition pulse is greater than 500 Hz, such as 100 Hz and 2000 Hz, the amplitude of the ignition pulse to achieve instant start changes very little. It is believed that the parasitic capacitance and inductance of the circuit and lamp at high frequency damp the ignition pulse, and the cost to further increase the ignition pulse frequency will increase substantially. Lamp assemblies therefore can achieve the associated advantages related to lamp life, performance, costs, safety, and EMI. Less material will evaporate from the electrode and thus prolong the electrode life. Less material evaporated from the electrodes also means less material deposited on the wall of the arc tube. Therefore, arc tube darkening results in a much lower rate and has a much higher lumen maintenance since the HID lamp is considered to reach end of useful lamp life when the lumen output is only 50% of the initial lumen output, this reduced darkening of the arc tube extends the lamp life.

Figure 11:
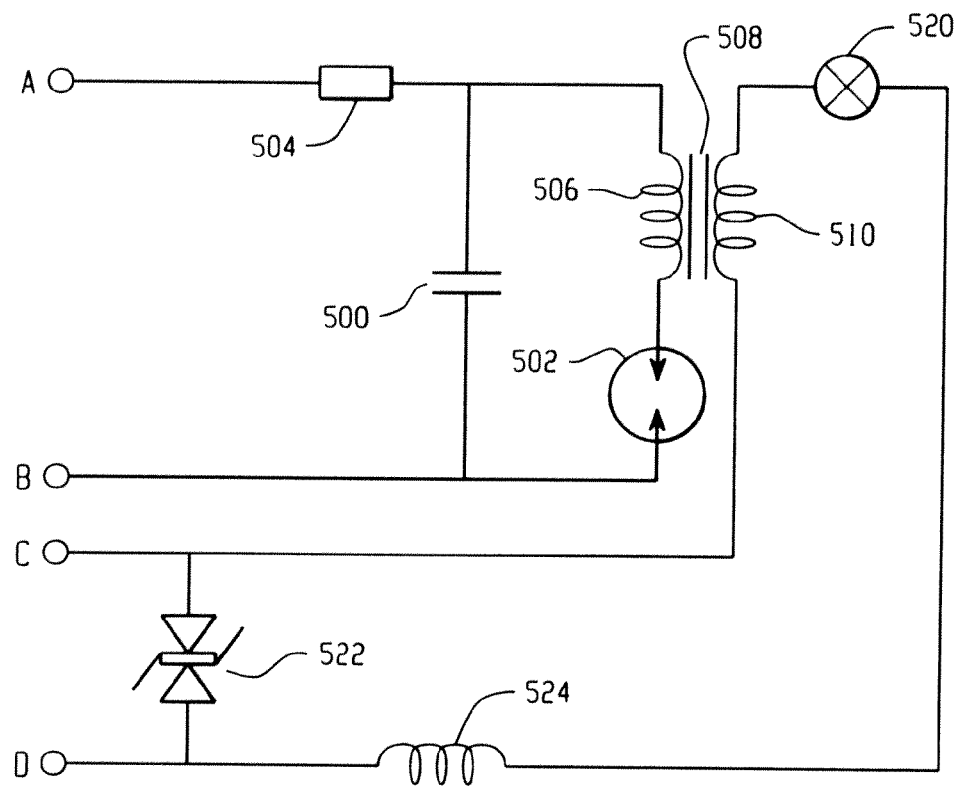
FIGS. 11 and 12 are schematics of preferred electrical circuits.
Figure 12:
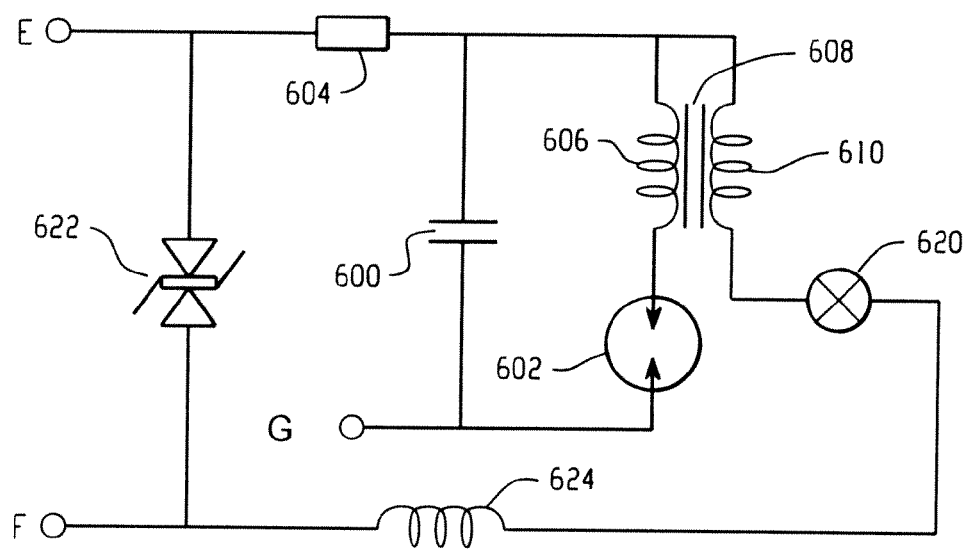

FIGS. 11 and 12 are schematic circuits that are used in the instant start, hot re-strike embodiments that are described above. FIG. 11 shows a four input arrangement in which inputs A and B are the direct current (DC) inputs (e.g., ~400 volts) to charge capacitor 500. Voltage builds up on the capacitor over time to a desired level to provide a sufficient voltage level for the rated spark gap 502 (e.g., rated at ~350 volts). The spark gap 502 is a gas discharge tube and not electrically conductive in normal condition. When the voltage across the spark gap 502 reaches higher than the rated voltage (e.g., ~350 volts), the gas inside spark gap 502 is ionized and discharged. The spark gap 502 becomes electrically conductive momentarily. The capacitor 500, spark gap 502 and primary winding 506 of transformer 508 form an electrical loop. The charge stored in the capacitor 500 is dumped into primary winding 506 of transformer 508 through spark gap 502, and a voltage pulse is generated in primary winding 506 of transformer 508. The voltage pulse in primary winding 506 of transformer 508 is further boosted by the turn ratio of transformer 508 to a much larger voltage pulse on the secondary winding 510 of transformer 508 to instant start the lamp 520. Again, by way of example only, if a 50:1 turn ratio is employed, then the voltage from the primary side of the transformer is boosted to become a 10 Kv instant start, hot re-strike voltage for lamp 520. Resistor 504 is used to control the charging current and can be rated at 50 Kohm as an example, although like the capacitor and spark gap ratings, they may be altered without departing from the scope and intent of the present disclosure. Once the lamp relights, the open circuit drops below the spark gap rated voltage and therefore no voltage pulse will be generated.

The third and fourth inputs C, D are the low voltage AC inputs for continued operation of the lamp. A MOV or Zener diode 522 is provided in this portion of the circuit that clamps the voltage during starting so that the re-strike voltage of approximately 10 Kv, for example, is not permitted to pass to the front end of the circuit. An inductor 524 may also be provided in the circuit to stabilize the circuit.

The arrangement of FIG. 11 (four input) has the advantage of isolating the low voltage lamp operation portion of the circuit from the hot re-strike portion. On the other hand, where the ballast is remotely located from the lamp, there is additional cost associated with the wire.

FIG. 12 is an alternative circuit used in conjunction with the instant start, hot re-strike HID lamp. More particularly, this illustrates a three input arrangement including first and second inputs E, F that are low voltage connections for lamp operation. The third input G works in conjunction with the first input E (which is common to the first and second portions of the circuit) for instant start, hot re-strike (e.g., a DC input of ~400 V or more) to charge the capacitor 600. Spark gap 602 and resistor 604 may be similarly rated as referenced with respect to the embodiment of FIG. 11. When the voltage across spark gap 602 reaches higher than the rated voltage (e.g., ~350 volts), the gas inside spark gap 602 is ionized and discharged. The spark gap 602 becomes electrically conductive momentarily. The capacitor 600, spark gap 602 and primary winding 606 of transformer 608 form an electrical loop. The charge stored in the capacitor 600 is dumped into primary winding 606 of transformer 608 through spark gap 602, and a voltage pulse is generated in primary winding 606 of transformer 608. The voltage pulse in primary winding 606 of transformer 608 is further boosted by the turn ratio of transformer 608 to a much larger voltage pulse on the secondary winding 610 of transformer 608 to instant start the lamp 620. A MOV or Zener diode 622 extends between the first and second inputs to clamp the voltage and again protect the low voltage portions of the circuit. Once the lamp is re-started, then the low voltage, AC current provided through inputs E, F will continue operating the HID lamp.

As will be recognized, the circuit portions are not fully isolated from one another in the embodiment of FIG. 12. However, this circuit advantageously has only three wires which can result in cost savings when compared to the four input connection of FIG. 11.

It is believed that the cost differential could be 50% or greater between conventional hot re-strike applications and those achieved with the present disclosure. Although it is known when the frequency of ignition pulses is increased, the required breakdown voltage is reduced, such reduction has heretofore only been on the level of approximately 20% reduction. Surprisingly, in this arrangement the pulse parameters achieve substantially better reduction than 20% in the breakdown voltage. In the ignition bursts, the ignition is on only less than 0.25 seconds. If the initial burst is insufficient to re-strike the lamp, the circuitry typically pulses for an extended period of time. Alternatively, it is envisioned that the ignition bursts may be limited to a predetermined number of times so as to save wear and tear on the insulation. This can be built into the ballast circuit.

Although the pulses are illustrated as being periodic and of the same amplitude, because simpler electronics are associated with a fixed period and equal amplitudes, the present disclosure should not be limited to such an arrangement. Typically the costs associated with variable periods and variable amplitudes need not be used. In addition, the wave can be triangular, square, or still other pulse shapes without any apparent impact on the instant start, hot re-strike of the HID lamp. A standard spacing between the G12 type HID lamp leads is 12 millimeters. Because there is a potential for arcing in the socket or in the sealed glass right at the base of the lamp at 13-14 kilovolts, the ability to achieve a hot re-strike at a level below 10 kilovolts, more preferably around 8 kilovolts is a substantial improvement.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A circuit for an instant start of a high intensity discharge (HID) lamp, the circuit comprising:
   a terminal for receiving an input voltage;
   an ignition circuit that includes a capacitor and a transformer having a primary winding and a secondary winding configured so that when switched "off", no voltage pulse is generated, and when switched "on" is connected to the terminal for providing breakdown voltage pulses each having an amplitude of at least 5 kilovolts and less than 25 kilovolts and a frequency of approximately 20 hertz or greater that instant start, hot re-strike ignite the HID lamp to generate light at at least eighty percent (80%) of rated luminous flux of the HID lamp.

2. The circuit of claim 1 wherein the frequency of the voltage pulses is greater than 100 hertz.

3. The circuit of claim 1 wherein the frequency of the voltage pulses is approximately 150 hertz.

4. The circuit of claim 3 wherein the amplitude of the voltage pulses is approximately 10 kilovolts.

5. The circuit of claim 1 wherein the amplitude of the voltage pulses is less than approximately 15 kilovolts.

6. The circuit of claim 5 wherein the amplitude of the voltage pulses is approximately 13 kilovolts.

7. The circuit of claim 6 wherein the frequency of the voltage pulses is approximately 20 hertz.

8. The circuit of claim 1 wherein the amplitude of the voltage pulses is approximately 10 kilovolts.

9. The circuit of claim 8 wherein the frequency of the voltage pulses is approximately 150 hertz.

10. The circuit of claim 1 wherein the amplitude of the voltage pulses is approximately 8 kilovolts.

11. The circuit of claim 10 wherein the frequency of the voltage pulses is approximately 500 hertz.

12. The circuit of claim 1 wherein each pulse having a pulse width of approximately 200 nanoseconds.

13. The circuit of claim 1 wherein peaks of the pulses are periodic and the period is approximately 2 milliseconds.

14. The circuit of claim 1 wherein the pulses are triangular or square.

15. The circuit of claim 1 wherein the pulses range up to approximately 2000 hertz.

16. The circuit of claim 1 wherein the HID lamp is a ceramic metal halide (CMH) lamp.

17. The circuit of claim 1 wherein the voltage pulses have substantially the same amplitude.

18. A method of re-striking a high intensity discharge (HID) lamp comprising:
   providing a low voltage pulse having an amplitude of at least 5 kilovolts and less than 20 kilovolts to the HID lamp in a hot condition after the HID lamp has been switched "off" and then when the HID lamp is turned "on" again; and
   repeating the low voltage pulse at a frequency ranging from approximately 20 hertz to approximately 500 hertz to instant start, hot re-strike the HID lamp to generate light at at least eighty percent (80%) of rated luminous flux of the HID lamp.

19. The method of claim 18 wherein the providing step is at an amplitude of approximately 8 kilovolts and the frequency of the pulses is approximately 500 hertz.

20. The method of claim 18 wherein the pulse width of the voltage pulses is approximately 200 nanoseconds and a time period between pulses is approximately 2 milliseconds.

* * * * *